J. H. & J. B. BEAM.
Still for the Manufacture of Alcoholic Spirits.
No. 165,201. Patented July 6, 1875.
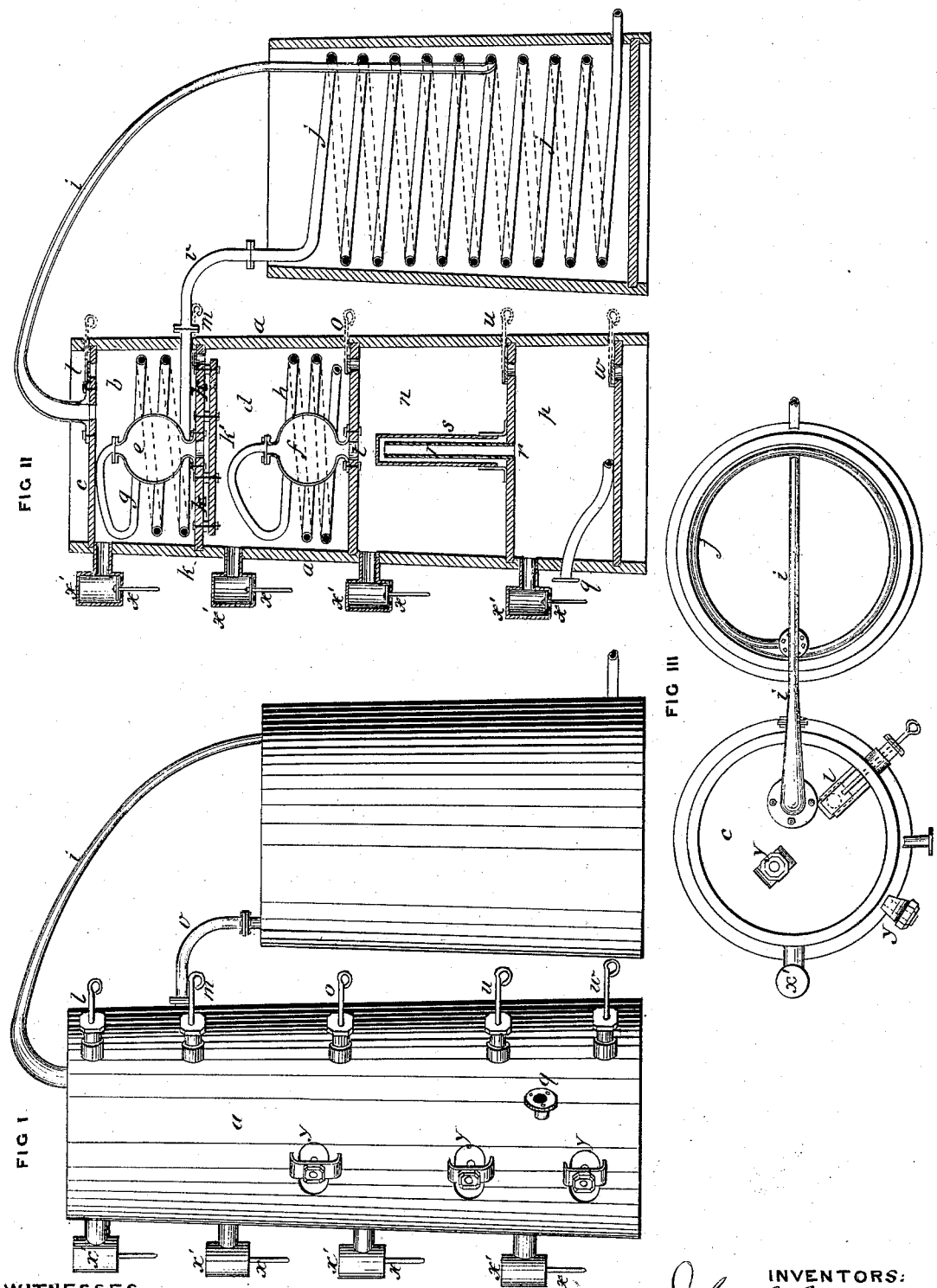

UNITED STATES PATENT OFFICE.

JOHN H. BEAM AND JOSEPH B. BEAM, OF BARDSTOWN, KENTUCKY.

IMPROVEMENT IN STILLS FOR THE MANUFACTURE OF ALCOHOLIC SPIRITS.

Specification forming part of Letters Patent No. 165,201, dated July 6, 1875; application filed February 3, 1875.

*To all whom it may concern:*

Be it known that we, JOHN H. BEAM and JOSEPH B. BEAM, of Bardstown, in the county of Nelson and State of Kentucky, have invented certain new and useful Improvements in Stills for the Manufacture of Alcoholic Spirits; and we do hereby declare that the following is a full, clear, and exact description thereof, which will enable others skilled in the art to which it pertains to make and use the same, reference being had to the accompanying drawings, and to the letters of reference marked thereon, which form a part of this specification.

The object of this invention is to produce very pure spirits, and to utilize as much as possible the heat necessary to carry on the distillation. These objects are accomplished by producing several evaporations and condensations, or partial condensations, within the body of the still, and by using the heat from the condensed vapors to heat up the fresh mash or beer and the portions partially distilled.

In the accompanying drawings, Figure 1 represents an elevation of a still embracing our invention; Fig. 2, a vertical section; and Fig. 3, a top view.

The following description will enable those skilled in the art to construct and use our invention: The still $a$ is constructed to carry out the process known as the "sour and sweet mash." It has four chambers communicating with each other by slide-valves and central heaters. The upper chamber $b$ is closed by a head, $c$, by which all the vapor rising in the still is saved; and this chamber with the next lowest one $d$ are provided with heaters consisting of a large copper vessel, $e$ and $f$, each having a coil of about five rounds of five-inch pipe, $g\ h$, connecting with and leading respectively from the top of the vessels, with each free end of the lower coil opening into the bottom of the chamber to let out the steam therein. These vessels and their coils are for the purpose of keeping the beer under a fast and high boiling from the steam with which they are constantly filled, and which, passing upward through the several chambers, enters the heating-vessels and passes out into the beer into the chamber $d$ while the alcohol passes direct from the coil $g$ into the singlings-worm. It is important to bring the beer to a boiling-heat before it is charged into the lower chambers, and this is done by the heater and coil in the upper chamber, which serves as the charger for the still, and from the head of which a pipe, $i$, conveys all the vapor which may form in the chamber $b$ to the singlings-worm $j$, arranged in a vessel near the still. The steam enters the second boiling-chamber direct, and to prevent the beer from boiling into the upper chamber we have combined with the chamber $d$ a false head, $k'$, as a covering for the communication between the chamber $d$ and the upper heating-vessel. This head is solid, about three inches thick, and is fastened to the head $k$ by copper bolts, leaving a free space between the heads of about three inches, and a space between the staves of the still of about four inches. As the beer becomes very much agitated when boiling it would be liable to throw up in the singlings-worm and be carried out with the singlings. The suspended head will counteract this undue agitation and prevent what is known as "spewing of the still." The upper chamber $b$ is charged with the beer through the valve $l$, where it is heated to a boiling-heat by the vapors passing up through vessel $e$ and worm $g$, and then discharged into the chamber $d$ by drawing the slide-valve $m$ where the beer is further heated and partially distilled by the vapors from the vessel $f$ and worm $h$, which are discharged into said chamber from said coil near its bottom. The beer is next charged into the chamber $n$ by drawing the slide-valve $o$, where it will further undergo the process of distillation, and is then let down into the bottom chamber $p$ through the slide-valve $u$. In the meantime the upper chamber $b$ is charged with fresh beer to take the place of the first charge let down, and thus one charge after another is let down. The steam by which the whole is heated enters the lower chamber $p$ through the pipe $q$ from a boiler not shown. The vapors generated rise through the pipe $r$ and pass under its hood or cap $s$ into the beer in chamber $n$; thence into the vessel $f$ and its coil $h$, from which it passes into the chamber $d$, and passing between the heads $k$ and $k'$ enters the vessel $e$ and the coil $g$ and passes out through the pipe $v$ into the singling-worm $j$, which is surrounded by cold water, and the singlings will be discharged at the end of the worm, the additional singlings-pipe $i$ extending from the head $c$ halfway down or more before it joins the worm, where all the vapor and steam from the upper chamber pass off. After the beer has been thoroughly distilled the slop from the still is discharged through the slide-valve $w$ from the bottom chamber $p$. As the beer is let down in succession from one chamber to another the still would be liable to collapse, and to prevent such a contingency each chamber is provided with an outside valve, $x$, fitted into side tube $x'$ and closing downward with a stem hanging below the tube by which to guide the valve and let in the air as each chamber is emptied of the beer into the next one below it. The valves act automatically to prevent collapse. Each chamber is provided with a man-hole, $y$, to allow access for repairs.

The following are some of the advantages of our invention, viz: First, by our improved apparatus and process twice the amount of beer can be distilled in six or twelve hours, with the same expense for fuel that it takes in ordinary distilling; second, by the employment of the heating vessel and coil in the closed charging-chamber the beer is boiled by the hot vapor passing into it in chambers $n$ and $d$, and through it in chamber $b$ on its way to the singlings-worm, and we therefore charge boiling beer into the still instead of cold beer; third, the closed charging-vessel will prevent the loss of any vapor while the beer is heating; fourth, all the vapors rising in the charging and heating chamber will be carried direct into the singlings-worm; fifth, by our process and apparatus we effect a saving of at least one-half more in fuel and time than is required in stills where the beer is charged in a cold condition, as it requires as much steam to bring the beer to a boil as it does to boil the spirits out of it; sixth, the upper vessel and coil being covered with beer all the time distilling is going on, will keep the charge all the time hot; seventh, the vessel and coil of the second chamber, with the steam passing therefrom direct into said chamber, will keep the beer under a quick boil with a comparatively small amount of steam from the boiler; eighth, our invention will produce a better quality of spirits, for the reason that the impurities are washed out and condensed in chambers $n$, $d$, and $b$, and only pure vapors enter the condensing-worm; ninth, in the process the several chambers are kept about two-thirds full, the fresh beer being charged into the first chamber, the second chamber with boiling beer, (where it is partly distilled,) and in the third chamber the distillation is nearly completed; tenth, by bringing the beer to a boil before it is charged into the still we can keep up a constant running of singlings from the beer, losing no time except to charge the still; eleventh, not having to use direct steam to boil the beer until it is charged into the still, we thereby effect a saving of one-half in fuel, and at least half in time, by our process, as it takes as long to bring the beer to a boil after it is charged into the still as it does to run the singlings from it after it begins to boil.

By our process the beer is charged in a boiling state, the yield is increased, and a finer article of spirits made from the same beer.

The central locations of the heating-vessels $e$ and $f$ serve to receive and hold quite a body of hot vapors and steam, and thereby heat the mash in the central portions of their respective chambers; while the coils $g$ and $h$, which encircle these central heaters, serve to conduct the hot vapors in a course near the walls of the chambers, and thereby heat the mash round the sides as well as the centers of these chambers, and bring it to and maintain it at a more uniform heat. The pipe $v$ forms a continuation of the coil $g$ and its central vessel, so that all the hot vapors collecting in this vessel from the lower chambers must give out the largest portion of their heat before passing into the condensing-coil; while from the chamber containing this heat all the spirits collecting therein during the preliminary heating and boiling of the beer are carried off by the pipe $i$ into the condenser, so that this single chamber $b$ serves to boil the inflowing beer; to contain the heater for effecting this; to contain the receiver and discharger for the hot vapors from the chambers below, and to generate and discharge hot vapors within and from said chamber into the condenser independent of the operation of the vapor receiving and heating chamber.

It is not original with us to construct a still with separate wash-chambers one above the other, and through which the mash is let down from one chamber to another during the process of boiling by valved openings, while at the same time the steam rises through the mash from one chamber to another by central communications in each to effect such boiling. Nor is the heating of the upper chambers by the vapors from the lower chambers claimed by us either as a process, or in connection with hooded communicating-pipes. Our improvements, however, while employed in connection with these features, form new combinations of elements co-operating to produce new and better results in the production of pure spirits from a single still divided into communicating mash-chambers.

We claim—

1. The combination of a centrally-located heat and vapor receiving vessel, $e$, and the coil $g$, leading from and surrounding it, with the charging-chamber $b$, said vessels communicating with the chambers below and the singlings-worm $j$, whereby the spirits and steam are caused to pass upward and out through said vessel, and the cold incoming beer brought to a boil by the central heating-surface and the coils near the walls of said chamber, substantially as herein set forth.

2. The centrally-located vessel $f$ and coil $h$ leading from and surrounding it within the chamber $d$, and opening therein, whereby the vapors are discharged from the chamber $n$ directly into the beer in the chamber $d$ to partially distil it, substantially as herein set forth.

3. The combination, with the chambers $b\ d$, of the central heating-vessels $e f$ and their surrounding coils $g\ h$, the coil $h$ opening into the bottom of the chamber $d$, to let out the hot vapors therein, and the coil $g$ terminating in the singlings-worm $j$, for the discharge of the spirits therein, as set forth.

4. The combination, with the closed chambers $b$ and $d$ and the vapor-receiving vessel $e$, of the closed head $k$ and false head $k'$, whereby the beer is prevented from being thrown up into the singlings-worm, and carried out with the singlings, by too great agitation in the charging-chamber, substantially as herein set forth.

5. The combination, with the charging-chamber $b$ and the centrally-located heat and vapor receiving vessel $e$ therein, of the singlings-pipe $i$ and the condensing-coil $j$, whereby the vapors generated by the hot vessel $e$ and its coil $g$ in the charging-chamber pass off during the preliminary heating and boiling of the beer, substantially as herein set forth.

6. The combination of the centrally-located vessel $f$ and its coil $h$ with the centrally-located vessel $e$ and its coil $g$ by means of the wall of the still and the perforated head $k$ and false bottom $k'$, substantially as herein set forth.

In testimony that we claim the foregoing we have affixed our signatures in presence of two witnesses.

JOHN H. BEAM.
J. B. BEAM.

Witnesses:
SAMUEL HUMPHREY,
J. W. MUIR.